US010410157B2

(12) United States Patent
Sundaresan et al.

(10) Patent No.: US 10,410,157 B2
(45) Date of Patent: Sep. 10, 2019

(54) PREDICTING RENEWAL OF CONTRACTS

(71) Applicant: Accenture Global Services Limited, Dublin (IE)

(72) Inventors: Kannan Sundaresan, Bangalore (IN); Rajeev Chadha, Bangalore (IN); Chacko Lakshminarasimhan, Chennai (IN); Shobhit Shrotriya, Bangalore (IN); Rajiv Banarji, Mumbai (IN)

(73) Assignee: Accenture Global Services Limited, Dublin (IE)

( * ) Notice: Subject to any disclaimer, the term of this patent is extended or adjusted under 35 U.S.C. 154(b) by 938 days.

(21) Appl. No.: 14/550,003

(22) Filed: Nov. 21, 2014

(65) Prior Publication Data

US 2016/0086112 A1    Mar. 24, 2016

(30) Foreign Application Priority Data

Sep. 23, 2014    (IN) .......................... 4623/CHE/2014

(51) Int. Cl.
 *G06Q 10/06* (2012.01)
 *G06Q 30/02* (2012.01)
 *G06Q 30/00* (2012.01)

(52) U.S. Cl.
 CPC ..... *G06Q 10/0635* (2013.01); *G06Q 30/0202* (2013.01); *G06Q 10/06375* (2013.01); *G06Q 30/016* (2013.01); *G06Q 30/0201* (2013.01)

(58) Field of Classification Search
 CPC ......... G06Q 30/0202; G06Q 10/06375; G06Q 30/016; G06Q 30/0201
 USPC ....................................................... 705/7.28
 See application file for complete search history.

(56) References Cited

U.S. PATENT DOCUMENTS

| 8,214,253 B1* | 7/2012 | Harris ................ G06Q 30/0201 455/3.04 |
| 8,401,883 B2 | 3/2013 | Villarreal |
| 2008/0262890 A1* | 10/2008 | Korupolu ............ G06F 11/0793 705/7.22 |

(Continued)

FOREIGN PATENT DOCUMENTS

CN    103366231 A    10/2013

OTHER PUBLICATIONS

Extended European Search Report corresponding to EP Application No. 15 16 3362, dated Jan. 20, 2016, 9 pages.

(Continued)

*Primary Examiner* — Johnna R Loftis
(74) *Attorney, Agent, or Firm* — Harrity & Harrity, LLP (57) ABSTRACT

A device may provide a user interface to a user device for inputting contract information. The device may receive the contract information from the user device via the user interface. The contract information may include information about a contract between a first party and a second party, and information about a relationship between the first party and the second party. The device may determine values for risk variables based on the contract information. The device may determine a risk score based on the values for the risk variables. The risk score may indicate a likelihood that the second party will renew the contract. The device may provide risk information to the user device to be displayed via the user interface. The risk information may indicate the risk score.

20 Claims, 6 Drawing Sheets

(56) References Cited

U.S. PATENT DOCUMENTS

| | | | | |
|---|---|---|---|---|
| 2009/0016279 A1* | 1/2009 | Beser | ............... | H04W 4/02 |
| | | | | 370/329 |
| 2009/0059912 A1* | 3/2009 | Rauba | ............... | G06Q 30/02 |
| | | | | 370/389 |
| 2011/0077986 A1* | 3/2011 | DeGregorio | ......... | G06Q 10/06 |
| | | | | 705/7.37 |
| 2011/0295649 A1 | 12/2011 | Fine et al. | | |
| 2011/0313931 A1 | 12/2011 | Bronstein et al. | | |
| 2012/0046990 A1 | 2/2012 | Codina | | |
| 2014/0067461 A1 | 3/2014 | Zhang et al. | | |
| 2014/0177544 A1* | 6/2014 | Kumar | ............... | H04L 47/828 |
| | | | | 370/329 |
| 2014/0229265 A1* | 8/2014 | Epner | ............... | G06Q 30/0235 |
| | | | | 705/14.35 |
| 2015/0058080 A1* | 2/2015 | Kaya | ............... | G06Q 30/0202 |
| | | | | 705/7.31 |
| 2015/0254703 A1* | 9/2015 | Epner | ............... | G06Q 30/0224 |
| | | | | 705/14.25 |
| 2016/0019661 A1* | 1/2016 | Bouganim | ............ | G06Q 50/01 |
| | | | | 705/319 |

OTHER PUBLICATIONS

Liu Cong, "Research on Model and Algorithm of Risk Evaluation of Financial Lease Contract," Times Finance, Sep. 30, 2013, No. 9, pp. 48-49.

\* cited by examiner

PREDICTING RENEWAL OF CONTRACTS

RELATED APPLICATION

This application claims priority under 35 U.S.C. § 119 to Indian Patent Application No. 4623/CHE/2014, filed on Sep. 23, 2014, the content of which is incorporated by reference herein in its entirety.

BACKGROUND

A first party (e.g., a person, a corporation, etc.) may enter into a contract with a second party. For example, the first party may be hired to perform a service for the second party. The second party may have the option to renew the contract at a renewal time.

SUMMARY

In some implementations described herein, a device may provide a user interface to a user device for inputting contract information. The device may receive the contract information from the user device via the user interface. The contract information may include information about a contract between a first party and a second party, and information about a relationship between the first party and the second party. The device may determine values for a plurality of risk variables based on the contract information. The device may determine a risk score based on the values for the plurality of risk variables. The risk score may indicate a likelihood that the second party will renew the contract. The device may provide risk information to the user device to be displayed via the user interface. The risk information may indicate the risk score.

In some implementations described herein, a computer-readable medium may store instructions that, when executed by one or more processors, may cause the one or more processors to monitor contract information for a contract. The contract information may include information about a contract between a first party and a second party, and information about how satisfied the second party is with the contract. The instructions may cause the one or more processors to determine values for a plurality of risk variables based on the contract information. The instructions may cause the one or more processors to determine a risk score based on the values for the plurality of risk variables. The risk score may indicate a probability that the second party will renew the contract. The instructions may cause the one or more processors to determine an action to be performed based on the risk score failing to satisfy a threshold risk score and the values for the plurality of risk variables. The action may be predicted to increase the likelihood that the second party will renew the contact. The instructions may cause the one or more processors to automatically cause the action to be performed to increase the likelihood that the second party will renew the contract.

In some implementations described herein, a method may include receiving, by a device, contract information from a user device. The contract information may include information about a contract between a first party and a second party, and information about a relationship between the first party and the second party. The method may include determining, by the device, values for a plurality of risk variables based on the contract information. The method may include determining, by the device, a risk score based on the values for the plurality of risk variables. The risk score may indicate a likelihood that the second party will renew the contract. The method may include providing, by the device, risk information to the user device. The risk information may indicate the risk score.

DETAILED DESCRIPTION

The following detailed description of example implementations refers to the accompanying drawings. The same reference numbers in different drawings may identify the same or similar elements.

When a service provider enters into a renewable contract with a client, it may be in the best interest of the service provider for the client to choose to renew the contract. Thus, the service provider may desire to know the probability that the client will renew the contract and/or actions that the service provider may take to increase the probability that the client will renew the contract.

Implementations described herein may provide a web-based user interface (UI) on a user device for the service provider to input information about the contract, the client, and/or a relationship between the service provider and the client. Furthermore, implementations described herein may determine a probability that the client will renew the contract based on the information input via the UI and/or other analytics (e.g., a state of the economy, cultural factors, etc.). Additionally, or alternatively, implementations described herein may determine a corrective action the service provider may take to increase the probability that the client will renew the contract, and may determine a cost of the corrective action.

Figure 1:
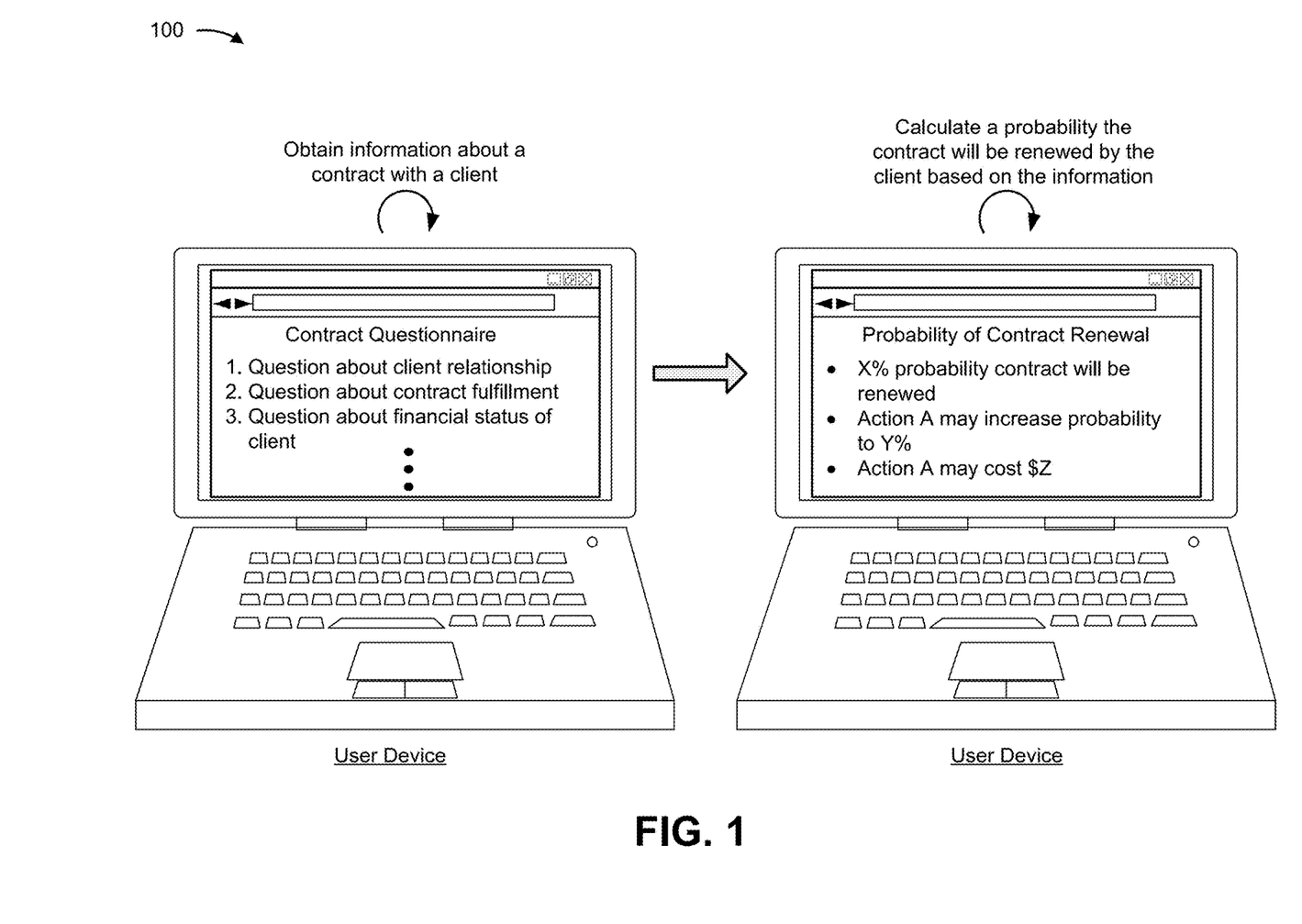
FIG. 1 is a diagram of an overview of an example implementation described herein.

FIG. 1 is a diagram of an overview of an example implementation 100 described herein. In FIG. 1, assume a service provider has a contract with a client for providing a service with the client. Further, assume a user associated with the service provider (e.g., an employee of the service provider) executes an application, on a user device, for calculating the probability that the contract will be renewed by the client at a renewal time.

As shown in FIG. 1, the application may cause the user device to display a UI for inputting information relevant to the client renewing the contract. For example, the UI may include a contract questionnaire that includes questions for the user to answer. The contract questionnaire may include one or more questions about a relationship between the service provider and the client (e.g., questions regarding a status of a professional relationship with the client, a status of a personal relationship with the client, etc.), one or more questions about contract fulfillment (e.g., questions regarding the service provider's fulfillment of the terms of the contract, the client's fulfillment of the terms of the contract, the timeliness of fulfillment, etc.), one or more questions about the financial status of the client (e.g., questions regarding the financial health of the client, quarterly financial reports, etc.), or the like.

The user may input information into the user device based on the questionnaire displayed by the UI. The user device may send the information to a server device (not shown) and the server device may receive the information. The server device may determine a probability that the client will renew the contract based on the information received from the user device, other information gathered about the client and/or the contract (e.g., information gathered before and/or during the contract with the client), and/or other analytics (e.g., a state of the economy, cultural factors, etc.). Additionally, or alternatively, the server device may determine corrective actions the service provider may take to increase the probability that the client will renew the contract. Furthermore, the server device may determine by how much the corrective actions will increase the probability of renewal and determine a cost of the corrective actions. The server device may provide information indicating the probability of renewal and the corrective actions to the user device. Additionally, or alternatively, the server device may automatically cause the corrective actions to be performed.

As further shown in FIG. 1, the user device may receive the information provided by the server device and present the information to the user. For example, the user device may present information indicating the probability of renewal (e.g., X %), corrective actions that may be performed to increase the probability of renewal (e.g., action A), the probability of renewal if the correction actions are performed (e.g., Y %), and/or a cost of the correction actions (e.g., $Z).

In this way, the service provider may be able to adopt the corrective actions proactively and/or automatically, before the renewal date, thereby increasing the probability of renewal of the contract by the client.

Figure 2:
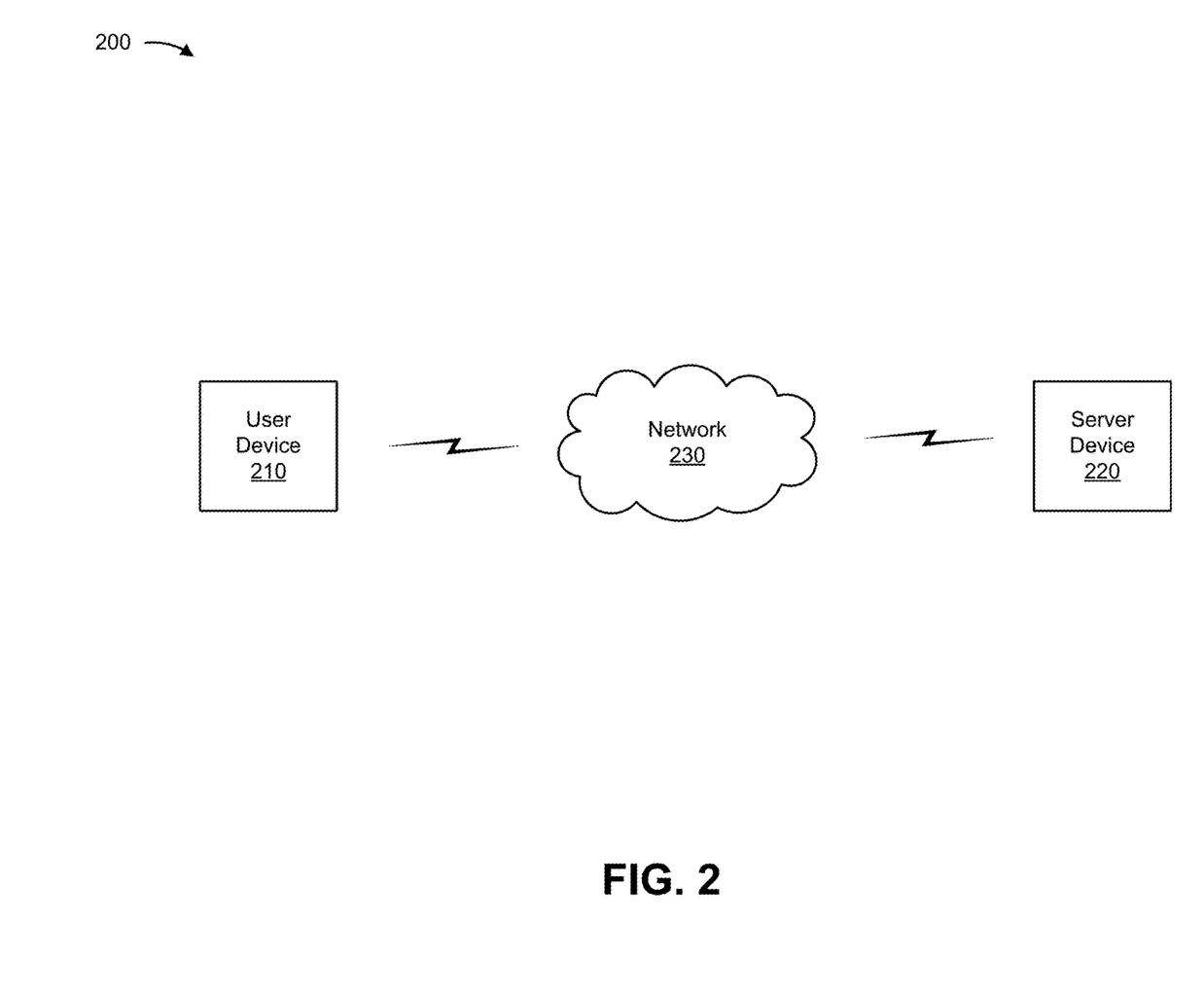
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and/or a network 230. Devices of environment 200 may interconnect via wired connections, wireless connections, or a combination of wired and wireless connections.

User device 210 may include a device capable of receiving, generating, storing, processing, and/or providing information. For example, user device 210 may include a communications and/or computing device, such as a mobile phone (e.g., a smart phone, a radiotelephone, etc.), a laptop computer, a tablet computer, a desktop computer, a handheld computer, or a similar device. In some implementations, user device 210 may receive information from and/or transmit information to another device in environment 200.

Server device 220 may include one or more devices capable of storing, processing, and/or routing information. For example, server device 220 may include a server or a group of servers. In some implementations, server device 220 may include a communication interface that allows server device 220 to receive information from and/or transmit information to other devices in environment 200. In some implementations, server device 220 may determine a probability that a contract will be renewed and/or corrective actions to increase the probability that the contract will be renewed.

Network 230 may include one or more wired and/or wireless networks. For example, network 230 may include a cellular network (e.g., an Long Term Evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, user device 210 and server device 220 may be implemented within the same device. Additionally, or alternatively, a set of devices (e.g., one or more devices) of environment 200 may perform one or more functions described as being performed by another set of devices of environment 200.

Figure 3:
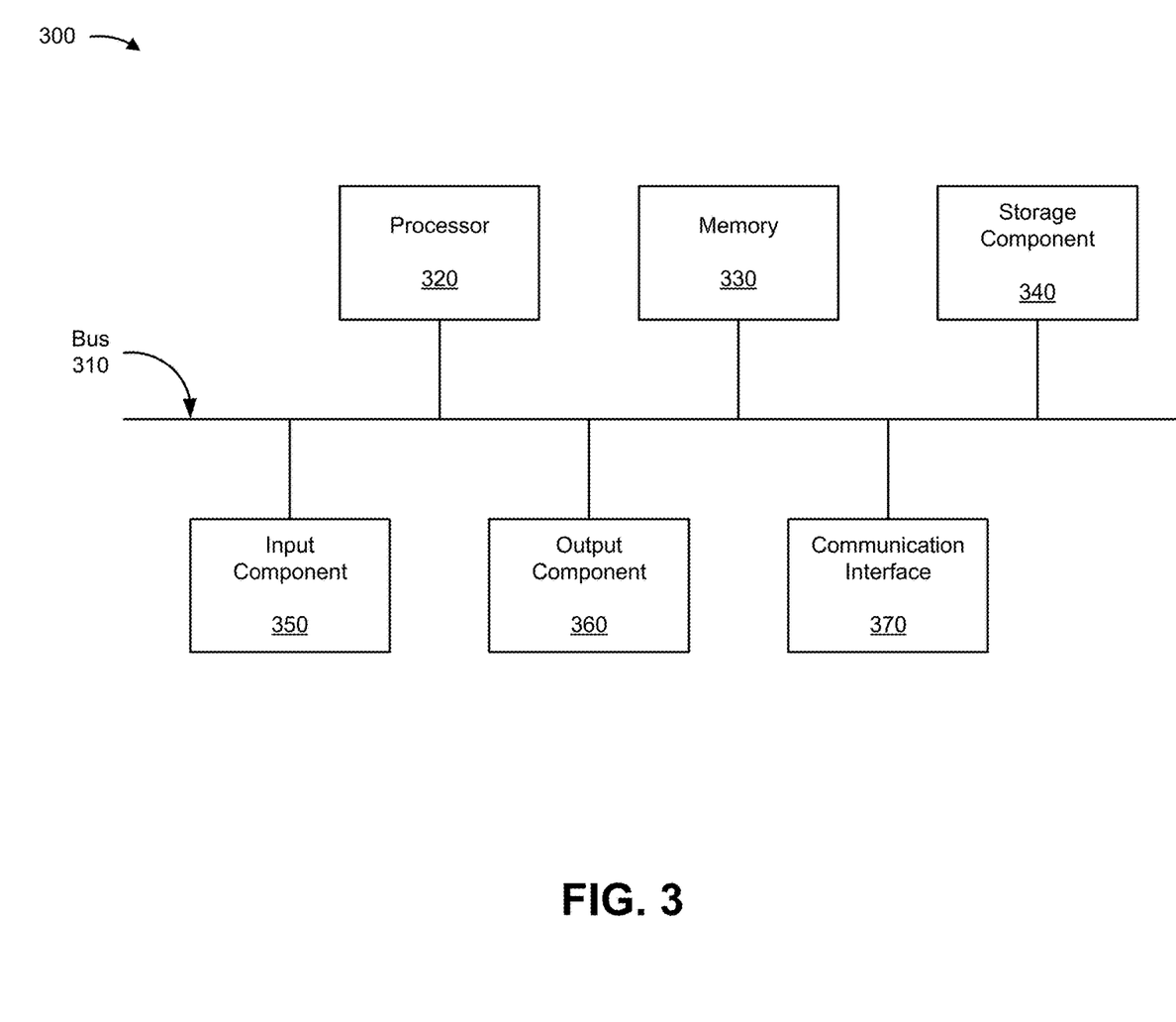
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
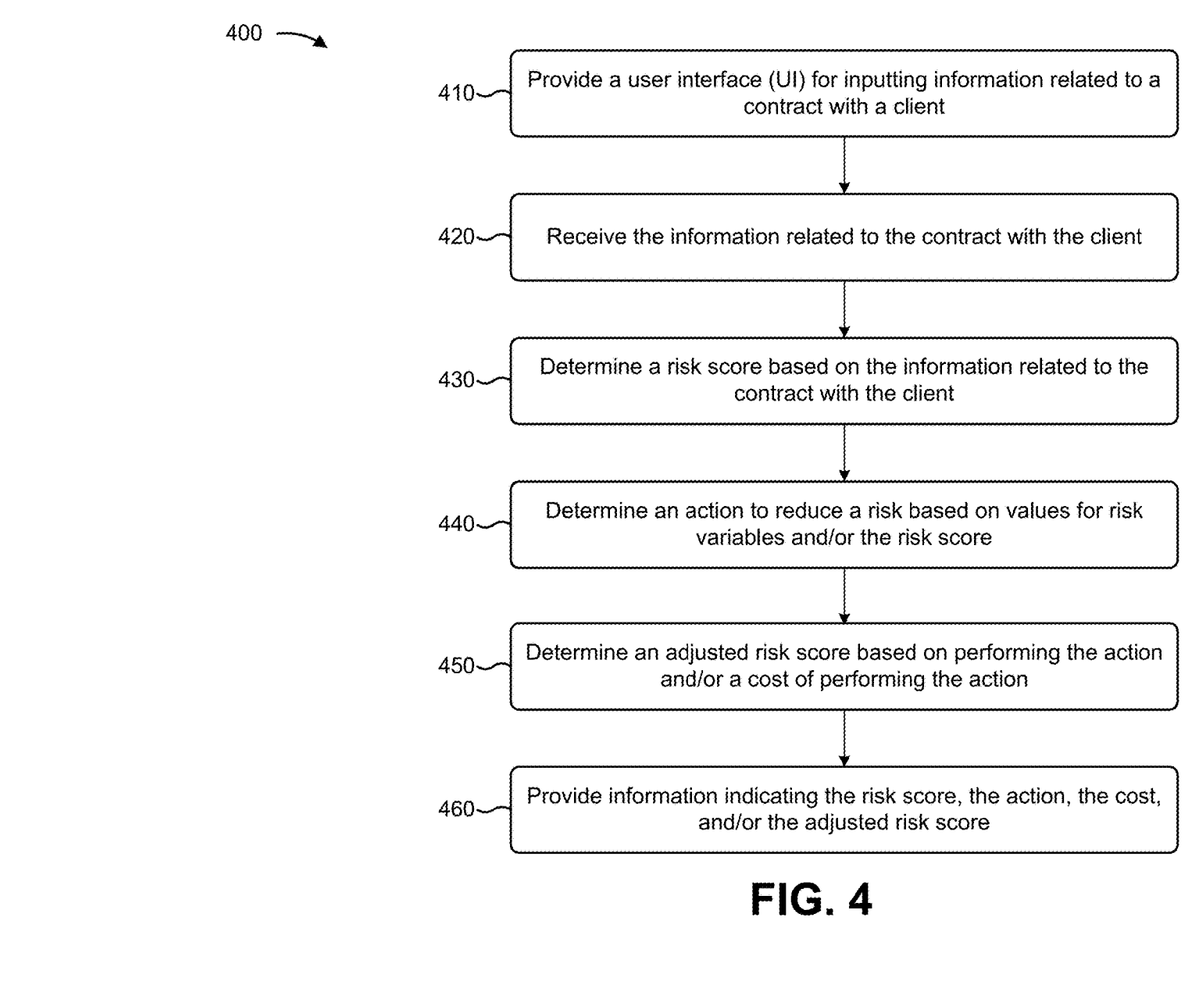
FIG. 4 is a flow chart of an example process for increasing the likelihood that a client will renew a contract.

FIG. 4 is a flow chart of an example process 400 for increasing the likelihood that a client will renew a contract. In some implementations, one or more process blocks of FIG. 4 may be performed by server device 220. In some implementations, one or more process blocks of FIG. 4 may be performed by another device or a group of devices separate from or including server device 220, such as user device 210.

As shown in FIG. 4, process 400 may include providing a UI for inputting information related to a contract with a client (block 410). For example, server device 220 may provide the UI to user device 210.

A user of user device 210 may cause user device 210 to execute an application that assists in increasing the likelihood that a client will renew a contract. The application may be a dedicated application installed on user device 210, an Internet browser that accesses a web service that assists in increasing the likelihood that a client will renew a contract, or the like. The application may cause user device 210 to send a request to server device 220 for a UI for inputting information related to a contract with a client. Server device 220 may receive the request and send the UI to user device 210 based on the request. User device 210 may receive the UI and present the UI for display to the user.

As further shown in FIG. 4, process 400 may include receiving the information related to the contract with the client (block 420). For example, server device 220 may receive, from user device 210 or elsewhere, the information related to the contract with the client.

In some implementations, the UI presented by user device 210 may prompt the user to input information associated with risk variables. A risk variable may represent a factor used to determine a risk score. A risk score may be a score that indicates the probability that the client will renew the contract with the service provider. The user may be an employee of the service provider, though one or more users may input the risk variables. For example, the user may be a person responsible for delivering the service to the client, for creating the contract with the client, for managing the contract with the client, for selling the service to the client, or the like.

In some implementations, the UI may include questions for the user to answer (e.g., a questionnaire, a survey, etc.). The questions may be associated with the risk variables and be used to cause the user to input information related to the risk variables. A user may input answers to the questions into user device 210 via the UI. An answer input by the user may correspond to a risk variable and/or be used to determine a value for a risk variable. Multiple answers to questions may be used to determine a single value for a risk variable or a single answer may be used to determine a single value for a risk variable. In some implementations, the answers to the questions may be text (e.g., a word, a sentence, etc.), a number and/or amount (e.g., a dollar value, a date, a percentage, etc.), a selection of a value from a list of values presented by the UI (e.g., a numerical value from a specified range (e.g., 1-5), a character value from among different character values associated with different answers (e.g., a-d)), a selection of a degree from a range of possible degrees (e.g., a selection from poor to good, below average to above average, very satisfied to very unsatisfied, favorable to unfavorable, etc.), or the like. User device 210 may send the answers to server device 220. Server device 220 may receive the answers and determine values for the risk variables based on the answers.

Additionally, or alternatively, the UI may present instructions for the user to input and/or upload particular information (e.g., a file, a client satisfaction survey, etc.). The user may input information to user device 210 via the UI based on the instructions. User device 210 may send the input information to server device 220. Server device 220 may receive the information and determine values for the risk variables based on the information.

Additionally, or alternatively, server device 220 may monitor the contract and/or the client, and receive the information related to the contract based on monitoring the contract and/or the client. Server device 220 may monitor the contract by obtaining records related to creating the contract, providing the service under contract, fulfilling the contract, public data structures (e.g., information on the Internet), or the like. For example, server device 220 may monitor contract details (e.g., a price of the contract, resources required to provide the service, a renewal date, etc.), the service provider's fulfillment of the contract (e.g., whether the service is provided as agreed, whether the service is provided on time, whether the client pays on time, etc.), client feedback about the contract (e.g., automatically obtain client satisfaction surveys completed by the client, obtain information about client complaints, obtain information about client calls to the service provider, etc.), a financial health of the client (e.g., a client's stock price, a client's market share, etc.), or the like. In some implementations, server device 220 may automatically gather the information related to the contract and/or the client from data structures maintained by the service provider and/or another party. Server device 220 may receive the information and determine values for the risk variables based on the information.

In some implementations, the risk variables may include a meet service expectations risk variable. The meet service expectations risk variable may indicate a degree that the service, provided by the service provider under the contract, meets the client's expectations. Additionally, or alternatively, the meet service expectations risk variable may indicate a quality of the service provided by the service provider, an accuracy of the service provided by the service provider, and/or a timeliness of the service provided by the service provider. In some implementations, the degree at which the contract meets the client's expectations may be proportional to the value for the meet service expectations risk variable (e.g., a high value may be based on the client's expectations being met, and a low value may be based on the client's expectations not being met). Accordingly, the meet service expectations risk variable may allow server device 220 to consider whether the client's expectations are being met and/or can be improved upon to increase the likelihood that the client will renew the contract.

In some implementations, the risk variables may include a meet business case risk variable. The meet business case risk variable may indicate a degree that the service provided by the service provider satisfies a business need of the client. In some implementations, the degree to which the business need of the client is satisfied may be proportional to the value for the meet business case risk variable (e.g., a high value may be based on the client's business need being satisfied, and a low value may be based on the client's business need not being satisfied). Accordingly, the meet business case risk variable may allow server device 220 to consider whether the business needs of the client are being met and/or can be improved upon to increase the likelihood that the client will renew the contract.

In some implementations, the risk variables may include a client competitiveness risk variable. The client competitiveness risk variable may indicate a degree that the service provided by the service provider improves the client's competitiveness with the client's competitors. In some implementations, the degree to which the client's competitiveness is improved may be proportional to the value for the client competitiveness risk variable (e.g., a high value may correspond to a large degree of improvement of the client's competitiveness, and a low value may correspond to small degree of improvement of the client's competitiveness). Accordingly, the client competitiveness risk variable may allow server device 220 to consider whether the client's competitiveness in the market is improved and/or can be further improved upon to increase the likelihood that the client will renew the contract.

In some implementations, the risk variables may include a client relationship risk variable. The client relationship risk variable may indicate a quality of a personal and/or professional relationship between the service provider and the client. In some implementations, the quality of the relationship be proportional to the value for the client relationship risk variable (e.g., a high value may correspond to a good client relationship, and a low value may correspond to a poor client relationship). Accordingly, the value for the client relationship risk variable may allow server device 220 to consider whether the client relationship is satisfactory and/or can be improved upon to increase the likelihood that the client will renew the contract.

In some implementations, the risk variables may include a profit per contract risk variable. The profit per contract risk variable may indicate an amount of profit and/or income the client derives from the service provided by the service provider under the contract. Additionally, or alternatively, the profit per contract risk variable may indicate an amount of profit and/or income the service provider derives from the contract. In some implementations, the amount of profit and/or income may be proportional to the value for the profit per contract risk variable (e.g., a high value may correspond to a large amount of profit and/or income, and a low value may correspond to a small amount of profit and/or income). Accordingly, the value for the profit per contract risk variable may allow server device 220 to consider whether the client's and/or service provider's profit is satisfactory and/or that can be improved upon to increase the likelihood that the client will renew the contract.

In some implementations, the risk variables may include a financial health of the client risk variable. The financial health of the client risk variable may indicate the client's financial position in the client's marketplace and/or the financial health of the client. In some implementations, the client's financial position in the client's marketplace and/or financial health may be proportional to the value for the financial health of the client risk variable (e.g., a high value may correspond to a large or improving market share of the client in the client's marketplace, and a low value may correspond to a small or decreasing market share). Accordingly, the value for the financial health of the client risk variable may allow server device 220 to identify the impact of the client's financial health on the likelihood that the client will renew the contract. In some circumstances, the client's financial health may be an area outside of the control of the service provider and may indicate a factor that the service provider cannot improve upon to increase the likelihood that the client will renew the contract. Thus, the financial health risk variable may indicate whether improving the likelihood of renewal is outside of the service provider's control.

In some implementations, the risk variables may include a competitive intelligence risk variable. The competitive intelligence risk variable may indicate other options available to the client that may replace the contract with the service provider. For example, the competitive intelligence risk variable may indicate similar services offered by the service provider's competitors, a cost of the competitor's services, a quality of the competitor's services, the client's ability to perform the service itself, or the like. In some implementations, the amount of options available to the client may be inversely proportional to the value for the competitive intelligence risk variable (e.g., a high value may correspond to a small number of options and/or low quality options available to the client, and a low value may correspond to a large number of options and/or a high quality of options available to the client). Accordingly, the value for the competitive intelligence risk variable may allow server device 220 to consider whether the service provider's competitiveness in the market is satisfactory and/or can be improved upon to increase the likelihood that the client will renew the contract.

In some implementations, the risk variables may include a service level risk variable. The service level risk variable may indicate a type of service provided by the service provider under the contract and/or an importance of the type of service to the client. In some implementations, the importance of the type of service provided by the service provider may be proportional to the value for service level risk variable (e.g., a high value may correspond to the service being important to the client, and a low value may correspond to the service not being important to the client). Accordingly, the value for the service level risk variable may allow server device 220 to identify the impact of the type of service on the likelihood that the client will renew the contract. In some circumstances, the type of service and the importance of that service to the client may be an area outside of the control of the service provider and may indicate a factor that the service provider cannot improve upon to increase the likelihood that the client will renew the contract. Thus, the service level risk variable may indicate whether improving the likelihood of renewal is outside of the service provider's control.

In some implementations, the risk variables may include a similar contracts risk variable. The similar contracts risk variable may indicate whether a different client had or has a similar contract to the client's contract and whether the similar contract was renewed. Additionally, or alternatively, the similar contracts risk variable may indicate whether the same client had or has a similar contract to the contract being evaluated and whether the similar contract was renewed. A similar contract may be a contract related to a same or similar service, a contract with a same or similar scope, a contract with a same or similar cost, a contract with another client that includes the same or similar service, scope, and/or cost, and/or the like. In some implementations, the proportion of similar contracts renewed may be proportional to the value for the similar contracts risk variable (e.g., a high value may correspond to a large proportion of similar contracts being renewed, and a low value may correspond to a small proportion of similar contracts being renewed). Accordingly, the value for the similar contracts risk variable may allow server device 220 to rely on the outcome of other contracts to predict the likelihood of renewal of the contract by the client.

In some implementations, the risk variables may include a different contracts risk variable. The different contracts risk variable may indicate whether the same client has or had other contracts with the service provider that are different from the contract being evaluated, and may indicate whether the other contracts were renewed by the client. In some implementations, the proportion of different contracts renewed may be proportional to the value for the different contracts risk variable (e.g., a high value may correspond to a large proportion of different contracts being renewed by the same client, and a low value may correspond to a small proportion of different contracts being renewed by the same client). Accordingly, the value for the different contracts risk variable may allow server device 220 to rely on the outcome of other contracts with the same client to predict the likelihood of renewal of the contract by the client.

In some implementations, the risk variables may include a historical information risk variable. The historical information risk variable may indicate how long the contract has been serviced by the service provider, a contract renewal date, what the transition was like when the service provider started providing the service, complaints from the client during the contract, a quality of service provided by the service provider, or the like. In some implementations, the quality of service provided by the service provider and/or the length of the contract may be proportional to the value for the historical information risk variable (e.g., a high value may correspond to a high quality of service, and a low value may correspond to a low quality of service). Accordingly, the value for the historical information risk variable may allow server device 220 to consider whether the quality of service provided by the service provider is satisfactory and/or can be improved upon to increase the likelihood that the client will renew the contract.

In some implementations, the risk variables may include a client pulse risk variable. The client pulse risk variable may indicate a subjective impression of the service provider regarding how happy the client is with the service provided by the service provider. For example, the subject impression may be based on a most recent interaction or meeting between the service provider and the client. In some implementations, how happy the client is with the service may be proportional to the value for the client pulse risk variable (e.g., a high value may correspond to the client being perceived to be happy with the service, and a low value may correspond to the client being perceived to be unhappy with the service). Accordingly, the value for the client pulse risk variable may allow server device 220 to identify whether action should be taken to improve the client's impression of the service provider.

In some implementations, the risk variables may include a client satisfaction score risk variable. The service provider may provide a client satisfaction survey to a client for the client to complete. The client satisfaction score risk variable may indicate the results of the client satisfaction survey. In some implementations, the value for the client satisfaction score risk variable may be based on the results of the client satisfaction survey. Accordingly, the value for the client satisfaction risk variable may allow server device 220 to identify whether the issues identified in the client satisfaction survey can be improved upon to increase the likelihood that the client will renew the contract.

In some implementations, the risk variables may include a client value creation through innovation risk variable. The client value creation through innovation risk variable may indicate an amount of value created, as perceived by the client, by the service provider's innovation when providing the service under the contract. In other words, the client value creation through innovation risk variable may indicate a degree of innovation by the service provider that the service provider's competitors may not be able to provide. In some implementations, the amount of value created via innovation may be proportional to the value for the similar contracts risk variable (e.g., a high value may correspond to a large amount of innovation, and a low value may correspond to a small amount of innovation). Accordingly, the value for the client value creation through innovation risk variable may allow server device 220 to identify whether innovation can be improved upon to increase the likelihood that the client will renew the contract.

In some implementations, the risk variables may include a staff engagement risk variable. The staff engagement risk variable may indicate a level of involvement and/or contact between the client's staff and the service provider's staff under the contract. In some implementations, the level of involvement and/or contact be proportional to the value for the staff engagement risk variable (e.g., a high value may correspond to a large amount of contact, and a low value may correspond to a small amount of contact). Accordingly, the value for the staff engagement risk variable may allow server device 220 to identify whether more interaction with the client would increase the likelihood that the client will renew the contract.

In some implementations, the risk variables may include a cultural alignment risk variable. The cultural alignment risk variable may indicate a degree of how the client's core values and/or business practices are aligned with the service provider's core values and/or business practices. In some implementations, the closer the client's core values and/or business practices are aligned, the higher the value for the cultural alignment risk variable. Conversely, the further apart the client's core values and/or business practices are from being aligned, the lower the value for the cultural alignment risk variable. Accordingly, server device 220 may be able to determine whether a cultural difference between the client and the service provider will impact the likelihood that the client will renew the contract.

As further shown in FIG. 4, process 400 may include determining a risk score based on the risk variables (block 430). For example, server device 220 may determine the risk score based on the values for the risk variables (e.g., the meet service expectations risk variable, the meet business case risk variable, the client competitiveness risk variable, the client relationship risk variable, the profit per contract risk variable, the financial health of the client risk variable, the competitive intelligence risk variable, the service level risk variable, the similar contracts risk variable, the different contracts risk variable, the historical information risk variable, the client pulse risk variable, the client satisfaction score risk variable, the client value creation through innovation risk variable, the staff engagement risk variable, and/or the cultural alignment risk variable).

As previously discussed, the risk score may be a score that indicates the probability and/or likelihood that a client will renew the contract with the service provider. In some implementations, the risk score may be determined by averaging or summing the values for one or more of the risk variables. Additionally, or alternatively, the values for the risk variables may be weighted and the risk score may be determined based on the weighted values for the risk variables. For example, a greater weight may be given to risk variables that have more of an impact on whether the client renews the contract (e.g., client pulse risk variable) than to a risk variable that may have less of an impact on whether the client renews the contract (e.g., client value through innovation risk variable).

In some implementations, the risk variables may be separated into different themes and a score may be generated for each theme. For example, the themes may include a client relationship theme (e.g., that may include the staff engagement risk variable, the client relationship risk variable, etc.), a voice of customer theme (e.g., that may include the client satisfaction score risk variable, the client pulse risk variable, etc.), a commercial theme (e.g., that may include the financial health of the client risk variable, the meet business case risk variable, etc.), a service-level agreement theme (e.g., that may include the service level risk variable, the similar contracts risk variable, etc.), and/or a cultural alignment theme (e.g., that may include the cultural alignment risk variable). In some implementations, the themes may be given the same weight or different weights and a score for each theme may be used to determine the risk score.

Accordingly, by assigning weights to risk variables and/or separating the risk variables into different themes, the influence of a particular risk variable and/or answer to a question input by a user may be managed. For example, values for risk variables that are determined based on answers to a relatively high number of questions may be balanced with scores for risk variables that are determined based on answers to a relatively low number of questions. Thus, the quantity of questions used to determine a value for a risk variable and/or a quantity of risk variables included in a theme may be controlled to not overly influence the risk score.

In some implementations, in addition to determining the risk score based on the values for the risk variables, server device 220 may determine the risk score based on factors external to the service provider, the client, and/or the contract. For example, the risk score may be based on a current state of the economy (e.g., stock market values, gross domestic production (GDP) statistics, etc.), newly established laws and/or regulations, market trends, consumer trends, etc. Server device 220 may receive information regarding these external factors from user devices 210 and/or from other devices (e.g., servers that monitor the external factors). In some implementations, server device 220 may receive this information in real time or near real time to provide the most up-to-date risk score.

The risk score may take the form of a score (e.g., a number), a probability (e.g., a ratio, a percentage, etc.), a confidence level (e.g., high, medium, low, etc.), or the like that indicates the likelihood that the client will renew the contract.

In some implementations, server device 220 may determine risk scores for contracts based on the contracts having a renewal date that satisfies a threshold date. For example, server device 220 may identify contracts that have renewal dates on or before a particular date, and calculate risk scores for each of those contracts. On the other hand, server device 220 may identify contracts that have a renewal date after the particular date, and not calculate risk scores for those contracts. In this way, processing resources can be conserved and not used on contracts that are not up for renewal within a particular time period.

In some implementations, server device 220 may calculate a risk score for a contract based on being contacted by the client (e.g., a client inquiring about the status of the contract, the client complaining about an issue, or the client initiating some other form of contact).

As further shown in FIG. 4, process 400 may include determining an action to reduce a risk based on the values for the risk variables and/or the risk score (block 440). For example, server device 220 may determine an action to reduce the risk that the client will not renew the contract. In other words, server device 220 may determine an action to increase the likelihood that the client will renew the contract. Server device 220 may determine one or more actions to reduce the risk.

An action may include changing a pricing model for the contract (e.g., decreasing a price for the service by a particular amount, align the pricing model with a competitor's offer, etc.), upgrading the service for the same price, offering a volume discount (e.g., offer the client a discount for additional services), increase engagement between the client and the service provider (e.g., have more face-time between an employee of the service provider and the client or an employee of the client), increase the quality of service provided under the contract (e.g., increase a bandwidth available for the service, assign priority to client's data traffic, etc.), assign more resources to service the contract (e.g., assign more employees of the service provider to handle the service provided by the contract), offer to provide additional services to the client (e.g., offer to manage or provide services for other aspects of the client's business), or the like.

In some implementations, the action may be determined based on the values for the risk variables. For example, if a value for one or more risk variables is low (e.g., fails to satisfy a threshold score), server device 220 may determine an action that may cause the values for the one or more risk variable to increase and, thus, increase the risk score (e.g., increase the likelihood that the client will renew the contract). For instance, if a value for the client relationship risk variable indicates a poor client relationship, server device 220 may determine that an action of increasing engagement between the client and the service provider may increase the risk score (e.g., increase the likelihood that the client will renew the contract) by improving the client relationship and, thus, select this action as a possible action to take. On the other hand, if a score for the client relationship risk variable indicates a strong client relationship, server device 220 may determine that an action of increasing engagement between the client and the service provider may have little or no influence on the risk score and, thus, not select this action as a possible action to take. In some implementations, server device 220 may determine an action to reduce the risk based on the risk score failing to satisfy a threshold risk score and may not determine an action to reduce the risk based on the risk score satisfying the threshold risk score. For example, if the risk score is sufficiently high (e.g., satisfies a threshold score), then an action may not have to be determined to increase the likelihood that the client will renew the contract because the client is already sufficiently likely to renew the contract.

As further shown in FIG. 4, process 400 may include determining an adjusted risk score based on performing the action and/or determining a cost of performing the action (block 450). For example, server device 220 may determine the adjusted risk score and/or the cost.

For each determined action, server device 220 may determine an adjusted risk score that indicates the risk score if the action is actually performed. In other words, the adjusted risk score may represent the likelihood that the client will renew the contract if the action(s) is actually performed. For instance, server device 220 may determine an adjusted risk score based on an X % volume discount being offered to the client and/or for adding Y number of employees to service the contract.

In some implementations, server device 220 may monitor past contracts and actions taken with respect to the past contracts. Server device 220 may store a data structure associating risk scores for the past contracts, actions taken with respect to the past contracts, and whether the contract was actually renewed after the action was performed. Server device 220 may determine the effectiveness of each action based on the data structure. Server device 220 may determine the adjusted risk score based on the effectiveness of the action and the originally determined risk score. In some implementations, the adjusted risk score may be based on an amount of time between the current date and the renewal date. For example, the longer the amount of time between the current date and the renewal date, the more likely the action may have an impact on the client's decision to renew the contract. Conversely, the shorter the amount of time between the current date and the renewal date, the less likely the action may have an impact on the client's decision to renew the contract.

In some implementations, server device 220 may determine an action or combination of actions that will result in an adjusted risk score that satisfies a threshold adjusted risk score. In some implementations, the threshold adjusted risk score may be a goal risk score specified by a user of user device 210. For example, the user of user device 210 may input a threshold adjusted risk score into user device 210 and user device 210 may send information indicating the threshold adjusted risk score to server device 220. In some implementations, the threshold adjusted risk score may be a default value.

Additionally, or alternatively, the threshold adjusted risk score may set be based on an amount of income and/or profit the service provider realizes from the contract. For example, server device 220 may obtain information about the contract and/or the client (e.g., via user input). The threshold adjusted risk score may be proportional to the amount of income and/or profit the service provider realizes from the contract. For instance, the larger the amount of income and/or profit generated by the contract, the larger the threshold adjusted risk score may be. Thus, the threshold adjusted risk may be higher for more profitable contracts than less profitable contracts because the service provider may be more interested in retaining the more profitable contracts.

Additionally, or alternatively, the threshold adjusted risk scored may be based on the client and/or other contracts with the client. For example, even if the particular contract with the client is not particularly profitable, the contract may be a gateway to obtaining more contracts with the client and/or retaining other existing contracts with the client. Thus, the service provider may be interested in retaining the contract even if the contract is not particularly profitable and the threshold adjusted risk score may be set accordingly.

In some implementations, for each determined action, server device 220 may determine a cost of the action. The cost may be in terms of money (e.g., a dollar amount), man hours, lost opportunity cost, lost income, lost profit, or the like. In some implementations, server device 220 may determine an action or combination of actions that will satisfy the threshold adjusted risk score at a minimum cost.

Additionally, or alternatively, server device 220 may determine a cost (e.g., a minimum cost) associated with reaching multiple adjusted risk scores. For example, server device 220 may determine a cost to raise the risk score by 5%, 10%, 20%, or the like. The cost of raising the risk score by a large percentage may be exponentially more than a cost of raising the risk score by a small percentage. For example, a cost to increase the risk score by 5% may be relatively inexpensive while the cost to increase the risk score by 10% may be relatively expensive. Accordingly, when a cost associated with reaching multiple adjusted risk scores are determined, the service provider may be able to make a cost-benefit analysis on which actions should be performed.

As further shown in FIG. 4, process 400 may include providing information indicating the risk score, the action, the cost, and/or the adjusted risk score (block 460). For example, server device 220 may provide the information indicating the risk score, the action, the cost, and/or the adjusted risk score to user device 210. User device 210 may receive the information and present the information (e.g., display the information). In this way, a user of user device 210 may be presented with information related to the likelihood the client will renew the contract and the user may proactively implement the suggested actions to improve the likelihood the client will renew the contract.

In some implementations, server device 220 may determine different sets of actions to take to increase the risk score. A set of actions may include one or more actions. Server device 220 may rank the sets of actions based on the increase to the risk score caused by the actions and/or the cost of the set of actions. Server device 220 may provide information indicating the sets of actions and the ranks of the sets of actions to user device 210 for display. In some implementations, server device 220 may recommend a set of actions that should be taken by the user based on the ranks (e.g., server device 220 may recommend a set of actions with a highest rank).

Additionally, or alternatively, server device 220 may automatically cause the determined action or actions to be performed. For example, server device 220 may cause the determined action or actions to be performed based on the risk score failing to satisfy a threshold risk score, the adjusted risk score satisfying an adjusted risk score threshold level, and/or the cost of the action or actions satisfying a threshold cost. For instance, server device 220 may automatically change a price model for the contract, reassign employees to service the contract, increase bandwidth or other resources assigned to the contract, generate a proposal for providing additional services to the client, or the like.

In some implementations, server device 220 may automatically cause the action to be performed. For example, server device 220 may automatically cause the action to be performed if the cost of the action satisfies a threshold cost. If the cost of the action does not satisfy the threshold cost, server device 220 may ask for permission from an employee of the service provider before causing the action to be performed. Accordingly, server device 220 may take action to improve the likelihood that the client will renew the contract without requiring user-interaction and based upon the risk score.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
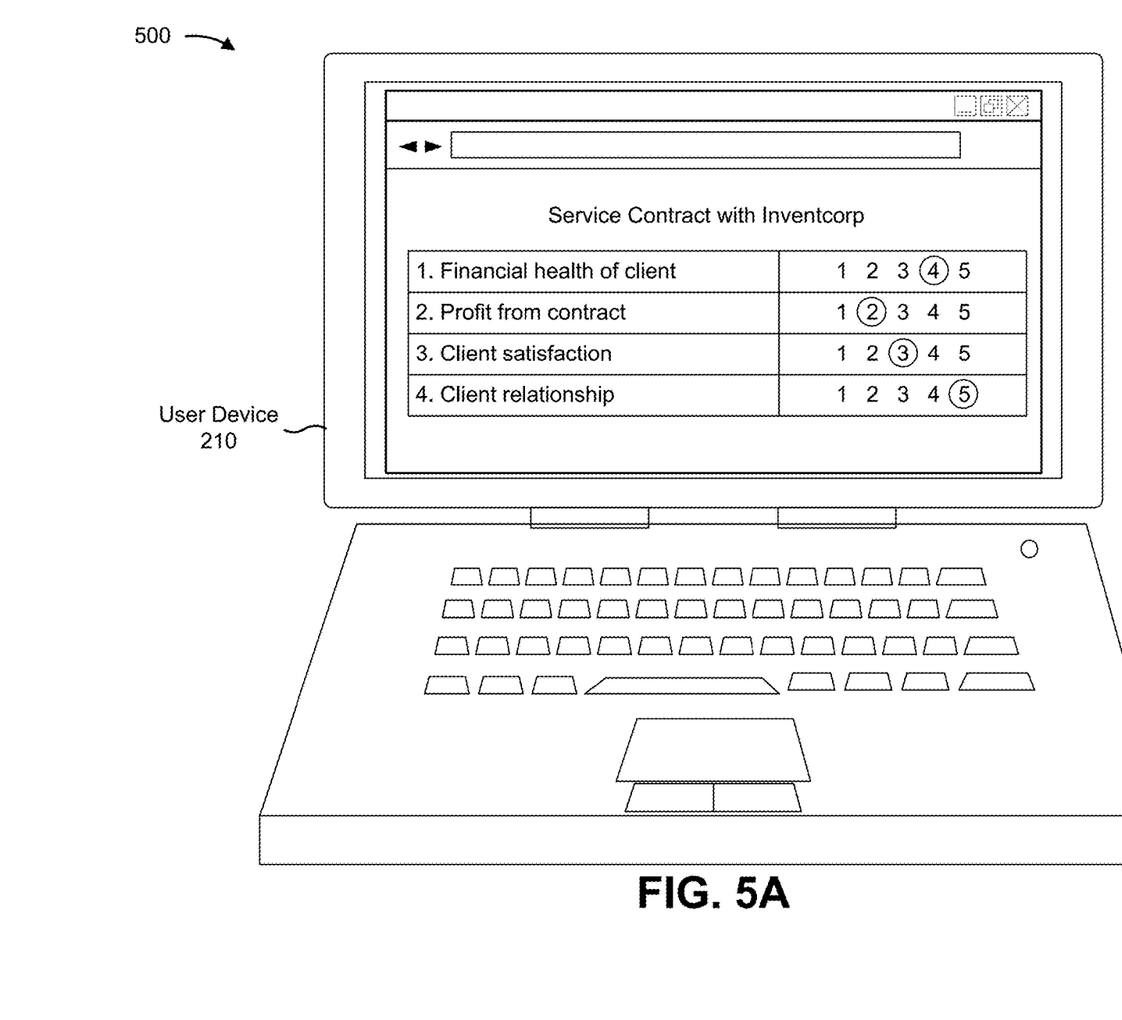
FIGS. 5A and 5B are diagrams of an example implementation relating to the example process shown in FIG. 4.
Figure 5B:
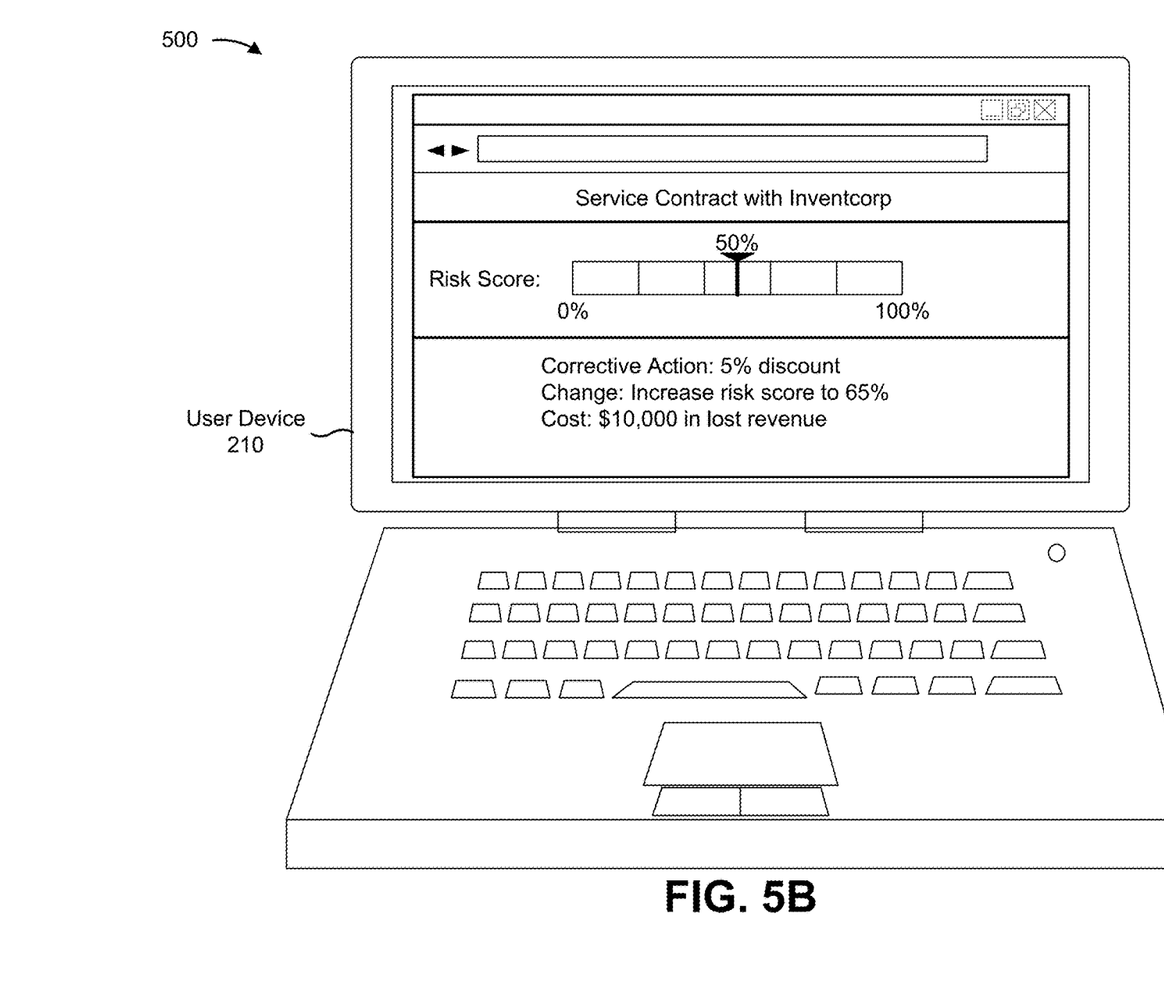

FIGS. 5A and 5B are diagrams of an example implementation 500 relating to example process 400 shown in FIG. 4. FIGS. 5A and 5B show an example of increasing the likelihood that a client will renew a contract.

In FIG. 5A, assume an employee of a service provider is responsible for managing a contract with Inventcorp. The employee may use user device 210 to log into a web-based application hosted by server device 220 (not shown). Server device 220 may identify the employee as responsible for managing the contract with Inventcorp based on the login and identify that the contract has a renewal date before a particular threshold date. Accordingly, server device 220 may provide a UI to user device 210 for inputting information about the contract between the service provider and Inventcorp based on the renewal date being before the particular threshold date.

User device 210 may receive the UI and display the UI. The UI may include questions for the employee of the service provider to answer on a scale of one to five. The questions may be associated with risk variables used to calculate the risk score for the contract. For example, the UI may ask the employee to rate the financial health of Inventcorp, the profit from the contract, Inventcorp's satisfaction with the contract, the relationship between the service provider and Inventcorp, etc. The employee may input a rating for each of the questions into user device 210 and user device 210 may send the ratings to server device 220. While example implementation 500 shows the employee as providing the information, some or all of this information may be automatically obtained by server device 220 upon receiving, from the employee, information identifying Inventcorp.

Server device 220 may receive the ratings and determine values for the risk variables based on the ratings. For example, server device 220 may determine a value for the client satisfaction score risk variable based on the rating for Inventcorp's satisfaction, a value for the client relationship risk variable based on the rating for the relationship between the service provider and Inventcorp, a value for the financial health of the client risk variable based on the rating for the financial health of Inventcorp, etc.

Server device 220 may determine the risk score based on the values for the risk variables. In example implementation 500, assume server device 220 determines a risk score of 50%. In other words, assume server device 220 determines there is a 50% chance that Inventcorp will renew the contract. Further, assume the risk score of 50% fails to satisfy a threshold risk score of 65% and, thus, server device 220 may determine an action to be taken to raise the risk score to 65%, or greater. Assume server device 220 determines that giving a 5% discount on the price of the service in the contract will result in an adjusted risk score of 65%. Further, assume server device 220 determines that giving a 5% discount to Inventcorp will cost the service provider $10,000 in lost revenue.

As shown in FIG. 5B, server device 220 may provide information identifying the risk score, the action, the cost, and the adjusted risk score. User device 210 may receive the information and present the information to the employee of the service provider. In this way, the employee may be informed that that Inventcorp has a 50% chance of renewing the contract and that the likelihood that the Inventcorp will increase to 65% if the service provider offers Inventcorp a 5% discount. Accordingly, the employee and/or the service provider may proactively offer Inventcorp the discount in an attempt to retain Inventcorp as a client.

As indicated above, FIGS. 5A and 5B are provided merely as an example. Other examples are possible and may differ from what was described with regard to FIGS. 5A and 5B.

Implementations described herein may provide a UI on a user device for the service provider to input information about a contract, a client, and/or are relationship between the service provider and the client. Furthermore, implementations described herein may determine a probability that the client will renew the contract based on the information input via the UI and/or other analytics (e.g., a state of the economy, cultural factors, etc.). Additionally, or alternatively, implementations described herein may determine corrective actions the service provider may take to increase the probability that the client will renew the contract, and may determine a cost of the corrective actions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory; and
    one or more processors to:
        provide a user interface to a user device for inputting contract information,
            the user device to execute an application to calculate a probability that a contract will be renewed between a first party and a second party;
        receive the contract information from the user device via the user interface,
            the contract information including information about a contract between the first party and the second party, and
            the contract information including information about a relationship between the first party and the second party;
        determine values for a plurality of risk variables based on the contract information;
        determine a risk score based on the values for the plurality of risk variables,
            the risk score indicating a likelihood that the second party will renew the contract;
        monitor past contracts and past actions taken with respect to the past contracts;
        store, in a data structure, risk scores associated with the past contracts, the past actions taken with respect to the past contracts, and whether the past contracts were renewed based on the past actions;
        determine an action to be performed based on the risk score failing to satisfy a threshold risk score and the values for the plurality of risk variables,
            the action to be performed being determined from a plurality of actions that will adjust the risk score to satisfy a threshold score at a minimum cost,
            the action being determined based in part upon the past contracts and the past actions taken with respect the past contracts stored in the data structure,
            the action being predicted to increase the likelihood that the second party will renew the contract, and
            the action including at least one of:
                prioritizing data traffic for the second party, or
                increasing a bandwidth available for a service provided to the second party;
        transmit risk information to the user device to be displayed via the user interface,
            the risk information including the action, minimum cost associated with the action, and a change to the risk score, and
            the risk information being transmitted to the user device via the user interface; and
        automatically cause the action to be performed based on the minimum cost satisfying the threshold score.

2. The device of claim 1, where the one or more processors are further to:
    determine an adjusted risk score based on the action,
        the adjusted risk score indicating an adjusted likelihood that that the second party will renew the contract if the action is performed, and
        the risk information indicating the adjusted risk score.

3. The device of claim 1, where the one or more processors are further to:
    determine the risk score fails to satisfy the threshold risk score.

4. The device of claim 3, where the contract information indicates at least one of a profit or a revenue generated by the contract, and
    where the threshold risk score is determined based on the profit or the revenue generated by the contract.

5. The device of claim 1, where the one or more processors, when determining the risk score, are further to:
    determine the risk score based on a renewal date of the contract satisfying a threshold date.

6. The device of claim 1, where the plurality of risk variables include a risk variable that indicates a degree that the service, provided by the first party under the contract, meets an expectation of the second party,
    where the one or more processors, when determining the risk score, are to:
        determine the risk score based on the degree that the service meets the expectation of the second party.

7. The device of claim 1, where the plurality of risk variables include a risk variable that indicates a degree that the service, provided by the first party under the contract, satisfies a business need of the second party,
    where the one or more processors, when determining the risk score, are to:
        determine the risk score based on the degree that the service satisfies the business need of the second party.

8. The device of claim 1, where the one or more processors are further to:
automatically gather the contract information from a data structure of the second party.

9. A computer-readable medium storing instructions, the instructions comprising:
one or more instructions that, when executed by one or more processors, cause the one or more processors to:
provide a user interface to a user device for inputting contract information;
monitor the contract information for a contract,
the contract information including information about a contract between a first party and a second party,
the user device to execute an application to calculate a probability that the contract between the first party and the second party will be renewed, and
the contract information including information about how satisfied the second party is with the contract;
determine values for a plurality of risk variables based on the contract information;
determine a risk score based on the values for the plurality of risk variables,
the risk score indicating a probability that the second party will renew the contract;
monitor past contracts and past actions taken with respect to the past contracts;
store, in a data structure, risk scores associated with the past contracts, the past actions taken with respect to the past contracts, and whether the past contracts were renewed based on the past actions;
determine an action to be performed based on the risk score failing to satisfy a threshold risk score and the values for the plurality of risk variables,
the action to be performed being determined from a plurality of actions that will adjust the risk score to satisfy a threshold score at a minimum cost,
the action being determined based in part upon the past contracts and the past actions taken with respect the past contracts stored in the data structure,
the action being predicted to increase a likelihood that the second party will renew the contract, and
the action including at least one of:
prioritizing data traffic for the second party, or
increasing a bandwidth available for a service provided to the second party;
transmit risk information to the user device to be displayed via the user interface,
the risk information including the action, minimum cost associated with the action, and a change to the risk score; and
automatically cause the action to be performed based on the minimum cost satisfying the threshold score.

10. The computer-readable medium of claim 9, where the plurality of risk variables include a risk variable that indicates a degree that the service, provided by the first party under the contract, meets an expectation of the second party,
where the one or more instructions, that cause the one or more processors to determine the risk score, further cause the one or more processors to:
determine the risk score based on the degree that the service meets the expectation of the second party.

11. The computer-readable medium of claim 9, where the plurality of risk variables include a risk variable that indicates a degree that the service, provided by the first party under the contract, satisfies a business need of the second party,
where the one or more instructions, that cause the one or more processors to determine the risk score, further cause the one or more processors to:
determine the risk score based on the degree that the service satisfies the business need of the second party.

12. The computer-readable medium of claim 9, where the plurality of risk variables include a risk variable that indicates a degree that the service, provided by the first party under the contract, improves an ability of the second party to compete with a competitor,
where the one or more instructions, that cause the one or more processors to determine the risk score, further cause the one or more processors to:
determine the risk score based on the degree that the service improves the ability of the second party to compete with the competitor.

13. The computer-readable medium of claim 9, where the plurality of risk variables include a risk variable that indicates a financial position of the second party in a marketplace,
where the one or more instructions, that cause the one or more processors to determine the risk score, further cause the one or more processors to:
determine the risk score based on the financial position of the second party in the marketplace.

14. The computer-readable medium of claim 9, where the plurality of risk variables include a risk variable that indicates a proportion of other contracts between the first party and other second parties that have been renewed,
the other contracts being similar to the contract,
where the one or more instructions, that cause the one or more processors to determine the risk score, further cause the one or more processors to:
determine the risk score based on the proportion of other contracts between the first party and other second parties that have been renewed.

15. The computer-readable medium of claim 9, where the plurality of risk variables include a risk variable that indicates a proportion of other contracts between the first party and the second party that have been renewed,
where the one or more instructions, that cause the one or more processors to determine the risk score, further cause the one or more processors to:
determine the risk score based on the proportion of other contracts between the first party and the second party that have been renewed.

16. A method, comprising:
providing, by a device, a user interface to a user device for inputting contract information,
the user device to execute an application to calculate a probability that a contract between a first party and a second party will be renewed;
receiving, by the device, contract information from the user device,
the contract information including information about the contract between the first party and the second party, and
the contract information including information about a relationship between the first party and the second party;
determining, by the device, values for a plurality of risk variables based on the contract information;
determining, by the device, a risk score based on the values for the plurality of risk variables,
the risk score indicating a likelihood that the second party will renew the contract;

monitoring, by the device, past contracts and past actions taken with respect to the past contracts;
storing, by the device and in a data structure, risk scores associated with the past contracts, the past actions taken with respect to the past contracts, and whether the past contracts were renewed based on the past actions;
determining, by the device, an action to be performed based on the risk score failing to satisfy a threshold risk score and the values for the plurality of risk variables,
the action to be performed being determined from a plurality of actions that will adjust the risk score to satisfy a threshold score at a minimum cost,
the action being determined based in part upon the past contracts and the past actions taken with respect the past contracts stored in the data structure,
the action being predicted to increase the likelihood that the second party will renew the contract, and
the action including at least one of:
prioritizing data traffic for the second party, or
increasing a bandwidth available for a service provided to the second party;
transmitting, by the device, risk information to the user device to be displayed via the user interface,
the risk information including the action, minimum cost associated with the action, and a change to the risk score; and automatically causing, by the device, the action to be performed based on the minimum cost satisfying the threshold score.

17. The method of claim 16, where determining the risk score further comprises:
assigning weights to the plurality of risk variables; and
determining the risk score based on the values for the plurality of risk variables and the weights of the plurality of risk variables.

18. The method of claim 16, further comprising:
determining a cost of the action,
the risk information indicating the action and the cost of the action.

19. The method of claim 18, further comprising:
determining an adjusted risk score based on the action,
the adjusted risk score indicating an adjusted likelihood that that the second party will renew the contract if the action is performed,
the risk information indicating the adjusted risk score.

20. The method of claim 16, further comprising:
automatically gathering the contract information from a data structure of the second party.

* * * * *